(12) United States Patent
Heacock et al.

(10) Patent No.: US 10,759,976 B2
(45) Date of Patent: Sep. 1, 2020

(54) COLOR CHANGEABLE ADHESIVES AND METHODS OF MAKING SUCH ADHESIVES

(71) Applicant: Sensor International, LLC, Snoqualmie, WA (US)

(72) Inventors: Gregory L Heacock, Maple Valley, WA (US); Andrew Mills, Holywood (GB)

(73) Assignee: Sensor International, LLC, Snoqualmie, WA (US)

(*) Notice: Subject to any disclaimer, the term of this patent is extended or adjusted under 35 U.S.C. 154(b) by 0 days.

(21) Appl. No.: 15/934,527

(22) Filed: Mar. 23, 2018

(65) Prior Publication Data
US 2019/0292421 A1 Sep. 26, 2019

(51) Int. Cl.
| C09J 11/06 | (2006.01) |
| C09J 11/08 | (2006.01) |
| C08L 1/28 | (2006.01) |
| C09B 11/26 | (2006.01) |
| C09B 11/06 | (2006.01) |
| C09K 9/02 | (2006.01) |

(52) U.S. Cl.
CPC .............. *C09J 11/06* (2013.01); *C08L 1/284* (2013.01); *C09B 11/06* (2013.01); *C09B 11/26* (2013.01); *C09J 11/08* (2013.01); *C09K 9/02* (2013.01)

(58) Field of Classification Search
CPC combination set(s) only.
See application file for complete search history.

(56) References Cited

U.S. PATENT DOCUMENTS

| 3,018,611 | A | 1/1962 | Biritz |
| 3,768,976 | A | 10/1973 | Hu |
| 3,899,295 | A | 8/1975 | Halpern |
| 3,939,968 | A | 2/1976 | Ryder |
| 4,003,709 | A | 1/1977 | Eaton |
| 4,098,577 | A | 7/1978 | Halpern |
| 4,135,792 | A | 1/1979 | Dreg |
| 4,526,752 | A | 7/1985 | Perlman |
| 4,692,309 | A | 9/1987 | Pannwitz |
| 4,728,499 | A | 3/1988 | Fehder |
| 5,053,452 | A * | 10/1991 | Spada ................. C08F 220/12 524/707 |
| 5,159,360 | A | 10/1992 | Stoy |
| 5,518,927 | A | 5/1996 | Malchesky |
| 5,623,323 | A | 4/1997 | Johnson |
| 5,706,073 | A | 1/1998 | Volk |
| 5,942,438 | A | 8/1999 | Antonoplos |
| 6,060,210 | A | 5/2000 | Eda |
| 6,114,509 | A | 9/2000 | Olsen |
| 6,132,086 | A | 10/2000 | Henwood |
| 6,218,189 | B1 | 4/2001 | Antonoplos |
| 6,254,969 | B1 | 7/2001 | Eberle |
| 6,270,724 | B1 | 8/2001 | Woodaman |
| 6,518,231 | B2 | 2/2003 | Appel |
| 6,634,747 | B1 | 10/2003 | Atkins |
| 6,634,753 | B1 | 10/2003 | Rozenman |
| 6,710,221 | B1 | 3/2004 | Pierce |
| 6,790,411 | B1 | 9/2004 | Forest |
| 6,851,808 | B2 | 2/2005 | Heacock |
| 7,219,799 | B2 | 5/2007 | Bonnette |
| 7,244,252 | B2 | 7/2007 | Bernt |
| 7,785,299 | B2 | 8/2010 | Crawford |
| 8,137,303 | B2 | 3/2012 | Crawford |
| 8,163,237 | B2 | 4/2012 | Crawford |
| 8,257,663 | B2 | 9/2012 | Crawford |
| 8,338,131 | B2 | 12/2012 | Callen |
| 8,388,131 | B2 | 3/2013 | Heacock |
| 8,663,998 | B2 | 3/2014 | Heacock |
| 9,746,421 | B2 | 8/2017 | Heacock |
| 2002/0022008 | A1 | 2/2002 | Forest |
| 2002/0023642 | A1 | 2/2002 | Holmsten |
| 2002/0137123 | A1 | 9/2002 | Hui |
| 2003/0199095 | A1 | 10/2003 | Yuyama |
| 2004/0115319 | A1 | 6/2004 | Morris |
| 2004/0180391 | A1 | 9/2004 | Gratzl |
| 2005/0041200 | A1 | 2/2005 | Rich |
| 2005/0125924 | A1 | 6/2005 | Benjamin |
| 2005/0164898 | A1 | 7/2005 | Kalsuri |
| 2006/0046301 | A1 | 3/2006 | Happe |
| 2006/0054525 | A1 | 3/2006 | Dean |
| 2006/0054526 | A1 | 3/2006 | Dean |

(Continued)

FOREIGN PATENT DOCUMENTS

| CN | 101479584 | 7/2009 |
| CN | 101501468 | 8/2009 |

(Continued)

OTHER PUBLICATIONS

Michael Freemantle, Intelligence Ink Detects Oxygen, Chemical Gas Sensing, Aug. 2, 2004, p. 11, vol. 82, No. 31, Chemical & Engineering News, USA (2 pages).
Swann et al., "Designing Out Curative Syringe Reuse: Maximising Global Acceptance and Impact by Design," Internet Citation, http://eprints.hud.ac.ukl11783/ [dated Sep. 18, 2013] abstract.
The Guardian, Architecture and Design Blog with Oliver Wainwright, "How colour-changing technology could revolutionise the medical industry," Internet Citation, http://www.theguardian.cco/artanddesign/architectarc-design-blog/2013/aug/28/colour-changing-syringe-medical-design [dated Sep. 18, 2013].

* cited by examiner

*Primary Examiner* — Monique R Peets
(74) *Attorney, Agent, or Firm* — McAndrews, Held & Malloy, Ltd.

(57) ABSTRACT

Color changeable materials can be incorporated into adhesive materials while maintaining the efficacy and stability of the indicator. The indicators provide simple, reliable, and cost effective detection means for detecting ammonia and carbon dioxide, and may find use in applications such as food packaging and medical applications.

10 Claims, 6 Drawing Sheets

(4 of 6 Drawing Sheet(s) Filed in Color)

(56) References Cited

U.S. PATENT DOCUMENTS

| | | |
|---|---|---|
| 2006/0069305 A1 | 3/2006 | Couvillon, Jr. |
| 2006/0110835 A1 | 5/2006 | Gohil |
| 2006/0181676 A1 | 8/2006 | Tucker |
| 2006/0236913 A1 | 10/2006 | Wills |
| 2007/0017042 A1 | 1/2007 | Cincotta |
| 2007/0140911 A1 | 6/2007 | Carney |
| 2008/0081020 A1 | 4/2008 | Huang |
| 2008/0129960 A1 | 6/2008 | Heacock |
| 2009/0266289 A1 | 10/2009 | Greene |
| 2009/0301382 A1 | 12/2009 | Patel |
| 2009/0303440 A1 | 12/2009 | Heacock |
| 2010/0112680 A1 | 5/2010 | Brockwell |
| 2011/0130727 A1 | 6/2011 | Crawford |
| 2011/0130728 A1 | 6/2011 | McKinnon |
| 2011/0259086 A1 | 10/2011 | Harris |
| 2012/0276647 A1 | 11/2012 | Mills |
| 2013/0130399 A1 | 5/2013 | Mills |
| 2013/0150785 A1 | 6/2013 | Heacock |
| 2013/0269592 A1 | 10/2013 | Heacock |
| 2013/0293353 A1 | 11/2013 | McPherson |
| 2014/0296402 A1 | 10/2014 | Jung |
| 2015/0087076 A1 | 3/2015 | Heacock |
| 2015/0225304 A1 | 8/2015 | Donze |
| 2015/0253252 A1 | 9/2015 | Smyth |
| 2015/0337179 A1* | 11/2015 | Lewandowski ....... C08F 220/26 526/318.43 |
| 2015/0346513 A1 | 12/2015 | Heacock |
| 2016/0011157 A1 | 1/2016 | Smyth |
| 2016/0327491 A1 | 11/2016 | Wood |
| 2018/0104017 A1 | 4/2018 | Heacock |

FOREIGN PATENT DOCUMENTS

| | | |
|---|---|---|
| EP | 0231499 | 8/1987 |
| EP | 2021755 | 5/2007 |
| WO | W002/099416 A1 | 12/2002 |
| WO | WO2013085655 | 6/2003 |
| WO | WO2004077035 | 9/2004 |
| WO | WO2015048138 | 4/2005 |
| WO | WO2007/018301 | 2/2007 |
| WO | WO2008095960 | 8/2008 |
| WO | WO2015/048138 * | 9/2014 |

COLOR CHANGEABLE ADHESIVES AND METHODS OF MAKING SUCH ADHESIVES

CROSS-REFERENCE TO RELATED APPLICATIONS

[Not Applicable]

FEDERALLY SPONSORED RESEARCH OR DEVELOPMENT

[Not Applicable]

BACKGROUND OF THE APPLICATION

Color changeable indicators are used to detect a number of substances (e.g. carbon dioxide or ammonia) in an environment and are particularly important in, amongst other things, medical applications and food and drug packaging. These color changeable indicators typically rely on reactive dyes or pigments. These dyes or pigments can exist in at least two different chemical states each having a different color. When the dye or pigment is in the first chemical state it appears a first color. When the dye or pigment is exposed to the substance that it is intended to detect, it undergoes a chemical reaction to form the second chemical state. In the second chemical state the dye or pigment appears a second color. In this manner it indicates the presence of the substance that it is intended to detect.

Various color change indicators and related apparatuses, as well as disposable, limited, and restricted use apparatuses, have been described in applications and patents co-owned by applicant. These color change indicators may be used to assess the condition of a disposable, limited use, or restricted use apparatus. These patents, applications and their related cases are incorporated herein by reference. U.S. Pat. No. 8,388,131, describes, for example, a disposable limited or restricted use apparatus that includes a color changeable portion wherein the time that the color change occurs is controlled so that it coincides to the approximate time of the end of one use of a single use apparatus or to the approximate expiration time for extended but limited or restricted use apparatus. U.S. patent application Ser. No. 14/292,246, for example, describes carbon dioxide sensing color change indicators for use with disposable, limited use, or restricted use apparatuses. U.S. Pat. No. 9,746,421 describes, for example, use protocol indicators having a color changeable dye that changes color after exposure to a particular environment for a defined time and an exposure time indicator that uses a color changeable dye or multiple color changeable dyes that change color after exposure to an environment in a sequential manner.

U.S. patent application Ser. No. 15/832,379, which is incorporated herein, deals with color changeable indicator particles having a particulate organic core with a low melting point, and at least one color changeable indicator coated on the organic core, that can be incorporated into thermoplastic polymer materials while maintaining the efficacy and stability of the indicator. Polymeric composites with indicator substantially homogenously dispersed within the composite can be fabricated utilizing meltable, organic color changeable indicator particles. The indicators provide simple, reliable, and cost effective detection means for detecting ammonia or carbon dioxide, enhance the safety, environmental friendliness, and visual effectiveness of the indicator and may find use in applications such as food packaging and medical applications.

In order to produce an indicator with a delayed color change using the color changeable composites (e.g. films) disclosed, for example, in U.S. patent application Ser. No. 15/832,379, adhesives are typically required. The composites are typically applied to a substrate using an adhesive. Another adhesive is then typically applied on top of the composite and a diffusion layer or semi-permeable barrier layer is applied on top of that adhesive. The resulting indicator involves five layers—substrate 101, first adhesive 102, composite 103, second adhesive 105 and diffusion layer 105 as shown in FIG. 1. Use of multiple layers in composing the color changeable sensor increases manufacturing costs and the complexity of the indicator. However, minimizing the number of layers is complex because adhesives tend to be needed in manufacturing color changeable sensors. Moreover, components of adhesives that assist in making the adhesive sticky may tend to aggravate or disrupt the chemistry of the color changeable composite. As described herein, a novel color changeable adhesive that allows for, among other things, stable, effective and consistent color change while simplifying the color changeable sensor by eliminating layers is described.

SUMMARY

Color changeable materials, e.g. pigments, dyes and/or color changeable particle coated with such pigments or dyes, can be incorporated into adhesive materials while maintaining the efficacy and stability of the color changeable material while at the same time the efficacy of the adhesive. This forms a color changeable adhesive. In one embodiment, such color changeable adhesives can then be used to combine a substrate and diffusion or semi-permeable barrier layer to create a three-layer color changeable indicator (e.g. as shown in FIG. 2), rather than the previously known five-layer indicators (e.g. as shown in FIG. 1). Removing the number of layers in the color changeable indicators significantly simplifies their manufacturing and reduces the cost of producing them. In another embodiment, such color changeable adhesives can be coated onto a substrate to form a color changeable indicator in the form of a tape or sticker. The indicators provide simple, reliable, and cost effective detection means for detecting substances, e.g. ammonia or carbon dioxide, and may find use in applications such as food packaging and medical applications.

In one embodiment the present method of producing a color changeable adhesive comprises (1) providing at least one carbon dioxide sensitive color changeable material selected from the group consisting of a color changeable pigment, dye, particle coated with a color changeable pigment or dye, or mixture thereof wherein the color changeable material has a pKa of 7.5 to 9.5; (2) adding a base to the color changeable material to produce a color changeable material composition having a pH that is equal to or 1.5 greater than the pKa of the color changeable material; (3) providing a pressure sensitive adhesive; (4) adding a base to the pressure sensitive adhesive to produce a pressure sensitive adhesive composition having a pH that is neutral or alkaline up to a pH equal to or 1.5 greater than the pKa of the color changeable material; (5) mixing the color changeable material composition with the pressure sensitive adhesive composition. The pigment, dye or particle can be substantially homogenously dispersed within the adhesive.

In one embodiment the present method of producing a color changeable adhesive comprises (1) providing at least one ammonia sensitive color changeable material selected from the group consisting of a color changeable pigment, dye, particle coated with a color changeable pigment or dye, or mixture thereof wherein the color changeable material has a pKa of 4.0 to 6.5; (2) adding an acid to the color changeable material to produce a color changeable material composition having a pH that is equal to or 1.5 less than the pKa of the color changeable material; (3) providing a pressure sensitive adhesive; (4) adding an acid to the pressure sensitive adhesive to produce a pressure sensitive adhesive composition having a pH that is neutral or acidic down to a pH equal to or 1.5 less than the pKa of the color changeable material; (5) mixing the color changeable material composition with the pressure sensitive adhesive composition. The pigment, dye or particle can be substantially homogenously dispersed within the adhesive.

In another embodiment the present color changeable adhesive comprises a color changeable material selected from the group consisting of a color changeable pigment, dye, particle coated with a color changeable pigment or dye, or mixture thereof wherein the color changeable material has a pKa of 7.5 to 9.5; and a pressure sensitive adhesive having a pH that is neutral or alkaline up to a pH equal to or 1.5 greater than the pKa of the color changeable material; wherein the pigment, dye or particle is dispersed within the adhesive and wherein the pigment, dye or particle is a carbon dioxide indicator. The pigment, dye or particle can be substantially homogenously dispersed within the adhesive.

In another embodiment the present color changeable adhesive comprises a color changeable material selected from the group consisting of a color changeable pigment, dye, particle coated with a color changeable pigment or dye, or mixture thereof wherein the color changeable material has a pKa of 4.0 to 6.5; and a pressure sensitive adhesive having a pH that is neutral or acidic down to a pH equal to or 1.5 less than the pKa of the color changeable material; wherein the pigment, dye or particle is dispersed within the adhesive and wherein the pigment, dye or particle is an ammonia indicator. The pigment, dye or particle can be substantially homogenously dispersed within the adhesive.

In one embodiment the present color changeable indicator comprises a substrate; and a color changeable adhesive disposed on said substrate wherein said color changeable adhesive comprises a color changeable material selected from the group consisting of a color changeable pigment, dye, particle coated with a color changeable pigment or dye, or mixture thereof wherein the color changeable material has a pKa of 7.5 to 9.5 and a pressure sensitive adhesive having a pH that is neutral or alkaline up to a pH equal to or 1.5 greater than the pKa of the color changeable material wherein the pigment, dye or particle is a carbon dioxide indicator. The color changeable indicator may further comprise a diffusion layer disposed on said color changeable adhesive.

In one embodiment the present color changeable indicator comprises a substrate; and a color changeable adhesive disposed on said substrate wherein said color changeable adhesive comprises a color changeable material selected from the group consisting of a color changeable pigment, dye, particle coated with a color changeable pigment or dye, or mixture thereof wherein the color changeable material has a pKa of 4.0 to 6.5 and a pressure sensitive adhesive having a pH that is neutral or acidic down to a pH equal to or 1.5 less than the pKa of the color changeable material wherein the pigment, dye or particle is an ammonia indicator. The color changeable indicator may further comprise a diffusion layer disposed on said color changeable adhesive.

In one embodiment the present method of producing a color changeable indicator comprises (1) providing a substrate; (2) applying a color changeable adhesive on said substrate wherein said color changeable adhesive comprises a color changeable material selected from the group consisting of a color changeable pigment, dye, particle coated with a color changeable pigment or dye, or mixture thereof wherein the color changeable material has a pKa of 7.5 to 9.5 and a pressure sensitive adhesive having a pH that is neutral or alkaline up to a pH equal to or 1.5 greater than the pKa of the color changeable material wherein the pigment, dye or particle is a carbon dioxide indicator. The method can further comprise applying a diffusion layer on said color changeable adhesive.

In one embodiment the present method of producing a color changeable indicator comprises (1) providing a substrate; (2) applying a color changeable adhesive on said substrate wherein said color changeable adhesive comprises a color changeable material selected from the group consisting of a color changeable pigment, dye, particle coated with a color changeable pigment or dye, or mixture thereof wherein the color changeable material has a pKa of 4.0 to 6.5 and a pressure sensitive adhesive having a pH that is neutral or acidic down to a pH equal to or 1.5 less than the pKa of the color changeable material wherein the pigment, dye or particle is an ammonia indicator. The method can further comprise applying a diffusion layer on said color changeable adhesive.

These and other advantages and novel features of the present invention, as well as details of illustrated embodiments thereof will be more fully understood from the following description and from the figures.

BRIEF DESCRIPTION OF SEVERAL VIEWS OF THE DRAWINGS

The patent or application file contains at least one drawing executed in color. It is understood that copies of this patent or patent application publication with color drawing(s) will be provided by the Office upon request and payment of the necessary fee.

Figure 1:
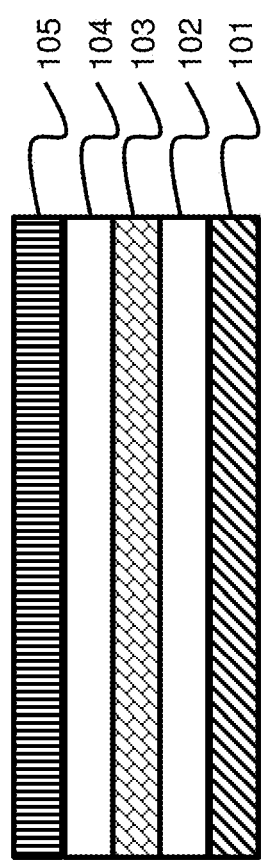
FIG. 1 shows a five-layer color changeable indicator.

The foregoing summary, as well as the following detailed description of certain embodiments of the present application, will be better understood when read in conjunction with the appended drawings. For the purposes of illustration, certain embodiments are shown in the drawings and described herein. It should be understood, however, that the claims are not limited to the arrangements and instrumentality shown in the attached drawings or the detailed description. Furthermore, the appearance shown in the drawings is one of many ornamental appearances that can be employed to achieve the stated functions of the system.

DETAILED DESCRIPTION

The present technology relates to color changeable adhesives formed from adhesives combined with color changeable materials, e.g. pigments, dyes or color changeable particles coated with such pigments or dyes, and methods of making and using such color changeable adhesives. The inventors found, surprisingly, that the color changing technology in the color changeable materials according to embodiments of the present invention continue to perform effectively after they are added to appropriate adhesives. That is, the chemistry of the adhesive does not affect the ability of the color changeable material (e.g., pigment, dye, and/or color changeable particle) to function as an indicator.

Method of Making Color Changeable Adhesives

In one embodiment, the present technology includes a method for making a color changeable adhesive comprising an adhesive and a color changeable material. First, the method includes providing a color changeable material, e.g., a pigment, dye and/or color changeable particle coated with such pigments or dyes, where the pKa of the pigment or dye is from about 7.5 to about 9.5 or from about 4.0 to about 6.5. The color changeable material can have certain qualities and/or be any of those discussed herein. Next, the method includes providing an adhesive according to embodiments of the present invention. The adhesive can have certain qualities and/or be any of those discussed herein, e.g. a pressure sensitive adhesive having certain traits.

The method optionally also includes adding an acid or base to the color changeable material to form a color changeable material composition. In one example, the method involves adding a base to a carbon dioxide sensitive color changeable material to produce a color changeable material composition having a pH equal to or 1.5 greater than the pKa of the color changeable material. In another example, the method involves adding acid to an ammonia sensitive color changeable material to produce a color changeable material composition having a pH equal to or 1.5 less than the pKa of the color changeable material.

The method optionally also includes adding an acid or base to the adhesive to form an adhesive composition. In one example, the method involves adding a base to the adhesive to produce an adhesive composition having a pH that is neutral or alkaline up to a pH equal to or 1.5 greater than the pKa of the color changeable material. In another example, the method involves adding acid to the adhesive to produce an adhesive composition having a pH that is neutral or acidic down to a pH equal to or 1.5 less than the pKa of the color changeable material.

The color changeable material (or color changeable material composition) is then combined with the adhesive (or adhesive composition) according to embodiments of the present invention. The color changeable material (or color changeable material composition) and adhesive (or adhesive composition) are then mixed together. They can be mixed such that the color changeable material (or color changeable material composition) is substantially homogenously dispersed within the adhesive (or adhesive composition). Typical methods of mixing can be used, including stirring, kneading, grinding, etc. The mixing is typically done at room temperature and pressure. However, mixing can be carried out with heat for some adhesives, such as hot-melt adhesives. Application of heat allows for some melting of one or both of the adhesive and the color changeable material which allows the color changeable material to mix into the adhesive to achieve a substantially homogenous mixture, e.g. to achieve a color changeable adhesive where the color changeable material is substantially homogenously dispersed in the adhesive.

Applicants have determined that the amount of color changeable material in the color changeable adhesive is helpful to achieve a workable consistency and desired color of the final color changeable adhesive. Specifically, the color changeable material in the color changeable adhesive ranges from approximately 0.05 to approximately 20 weight percent of the color changeable adhesive, alternatively about 0.5 to about 10 weight percent, alternatively about 1 weight percent. A level of color changeable material above approximately 20 weight percent results in the color changeable material interfering with the functionality of the adhesive.

Other aspects of the methods are described herein and materials used in the methods are described herein.

Color Changeable Materials

As discussed above, the present color changeable adhesives are produced by combining a color changeable material (or color changeable material composition) with an adhesive (or adhesive composition). The present color changeable materials are pigments, dyes or color changeable particles coated with such pigments or dyes. Various pigments or dyes can be used as or in the present color changeable material. The color changeable material can respond to the presence of different chemical substances such as carbon dioxide and ammonia.

The color changeable material (e.g. pigment, dye and/or particle) has Ka and pKa values. pKa is the negative logarithm of the acid dissociation constant, Ka. The pKa and Ka are a quantitative measure of the strength of an acid in solution. Ka is the equilibrium constant for a chemical reaction known as dissociation. In aqueous solution, the equilibrium of acid dissociation can be written symbolically as $$HA + H_2O \rightleftharpoons A^- + H_3O^+$$

where HA is a generic acid that dissociates into $A^-$, known as the conjugate base of the acid and a hydrogen ion which combines with a water molecule to make a hydronium ion.

The chemical species HA, $A^-$ and $H_3O^+$ are said to be in equilibrium when their concentrations do not change with the passing of time. The dissociation constant is usually written as a quotient of the equilibrium concentrations (in mol/L), denoted by [HA], [$A^-$] and [$H_3O^+$]

$$K_a = \frac{[A^-][H_3O^+]}{[HA][H_2O]}$$

In most cases, the concentration of water can be taken as constant and can be ignored. The chemical equation and definition can then be written more simply as $$HA \rightleftharpoons A^- + H^+ : K_a = \frac{[A^-][H^+]}{[HA]}$$

It is more convenient to discuss the negative logarithmic constant, pKa or $-\log_{10}(Ka)$.

The more positive the value of pKa, the smaller the extent of dissociation at any given pH, i.e. the weaker the acid. A weak acid has a pKa value in the approximate range −2 to 12 in water. Acids with a pKa value of less than about −2 are said to be strong acids.

For the present color changeable materials, most of the molecules of the pigment or dye will be one color in the HA (protonated) state and another color in the A⁻ (deprotonated) state. The substance that is being detected, e.g. carbon dioxide or ammonia, will drive the above reaction to occur in one direction or the other and cause the molecules of the pigment or dye to change from the first color in the first state to the second color in the second state. Carbon dioxide will be used throughout as an example of a substance being detected that protonates the color changeable material. Ammonia will be discussed throughout as an example of a substance being detected that deprotonates the color changeable material. It is understood that the discussion could apply similarly to other substances.

In one example, a carbon dioxide sensitive material (or color changeable material composition, i.e. a composition containing the carbon dioxide sensitive material and other components, e.g. base) is configured such that most of the molecules of the pigment or dye are in the deprotonated or A⁻ state in an environment with little or no carbon dioxide, e.g. air at atmospheric conditions. As such, the pigment or dye will exhibit the first color in an environment with little or no carbon dioxide. When the pigment or dye is exposed to higher levels of carbon dioxide, the molecules of the pigment or dye react with the acidic form of carbon dioxide, carbonic acid, to form their protonated or HA state, which results in a change in color of the pigment or dye from the first color when most molecules are in the A⁻ state to the second color when more molecules are in the HA state. As another example, an ammonia sensitive pigment or dye or color changeable material composition is configured such that most of the molecules of the pigment or dye are in the first protonated or HA state in an environment with little or no ammonia, e.g. air at atmospheric conditions. As such, the pigment or dye will exhibit the first color in an environment with little or no ammonia. When the pigment or dye is exposed to higher levels of ammonia, the molecules of the pigment or dye react with ammonia to form their deprotonated or A⁻ state, which results in a color change in the pigment or dye from the first color when most molecules are in the HA state to the second color when more molecules are in the A⁻ state.

When making a color changeable adhesive according to an embodiment of the present invention, the color changeable material (or color changeable material composition) should be selected in such a way as to maintain most of the molecules of the color changeable pigment or dye in the first state and first color in an environment with little or none of the substance being detected until exposure to that substance. For example, the carbon dioxide sensitive color changeable material (and any other components of the carbon dioxide sensitive color changeable material system, e.g. base) should be selected and formulated to keep most of the molecules of the carbon dioxide sensitive color changeable pigment or dye in their first deprotonated or A⁻ state and first color in an environment with little or no carbon dioxide. As another example, the ammonia sensitive color changeable material (and any other component of the ammonia sensitive color changeable material system, e.g. acid) should be selected in such a way as to maintain most of the molecules of the ammonia sensitive color changeable pigment or dye in their first protonated or HA state and first color in an environment with little or no ammonia.

The pKa for a substance, e.g. a color changeable material, is one factor in determining how many molecules of the pigment or dye will be present in the protonated or HA state and how many molecules of the pigment or dye will be present in the deprotonated or A⁻ state under certain conditions. Specifically, the pKa of a color changeable material can be understood to be the pH of the color changeable material composition containing the color changeable pigment or dye at which 50% of the molecules of a color changeable pigment or dye are in the protonated form and 50% are in the deprotonated form. As such, the pKa of a color changeable material affects its effectiveness as a color changeable material in the present color changeable adhesives.

Applicants have determined that maintaining the pH of a carbon dioxide sensitive color changeable material (or color changeable material composition) at a pH that is greater than or equal to about 1.5 above the pKa of the carbon dioxide sensitive color changeable material, maintains most of the molecules of the carbon dioxide sensitive color changeable material in their first deprotonated or A⁻ state and first color in the presence of little or no carbon dioxide, alternatively at greater than or equal to about 2.0 above the pKa of the color changeable material. Similarly, applicants have determined that maintaining the pH of an ammonia sensitive color changeable material (or color changeable material composition) at a pH that is less than or equal to about 1.5 below the pKa of the ammonia sensitive color changeable material, maintains most of the molecules of the ammonia sensitive color changeable material in their first protonated or HA state and first color in the presence of little or no ammonia, alternatively less than or equal to about 2.0 below the pKa of the color changeable material. This means that a carbon dioxide sensitive color changeable material having a pKa of 7.5 would maintain most of the molecules of the carbon dioxide sensitive color changeable material in their first deprotonated or A⁻ state and first color when formulated in a color changeable material composition having a pH of at least about 9 and in the presence of little or no carbon dioxide. As another example, an ammonia sensitive color changeable material having a pKa of 6.5 would maintain most of the molecules of the ammonia sensitive color changeable material in the first protonated or HA state and first color when formulated in a color changeable material composition having a pH of at least about 5 and in the presence of little or no ammonia.

The sensitivity of the color changeable materials can also be adjusted through material selection using pKa. The pKa of the color changeable material also factors into how sensitive the color changeable material is to the substance being detected. For example, a larger pKa for a carbon dioxide sensitive dye, pigment or particle is generally more sensitive to carbon dioxide. This means a carbon dioxide sensitive dye, pigment or particle having a pKa of 7.5 would be less sensitive, i.e. require more carbon dioxide to initiate a color change reaction, than one having a pKa of 9.5 which would require less carbon dioxide. As another example, a larger pKa for an ammonia sensitive dye, pigment or particle means it is less sensitive to ammonia. This means an ammonia sensitive dye, pigment or particle having a pKa of 4.0 would be more sensitive, i.e. require less ammonia to initiate a color change reaction, than one having a pKa of 6.5 which would be less sensitive, i.e. require more ammonia. Thus, color changeable materials that are more or less reactive to the substance being detected can be selected.

Based on the chemistry discussed above, Applicants have determined that carbon dioxide sensitive color changeable materials, e.g. pigments, dyes or particles, useful in the present technology typically have a pKa ranging from about 7.5 to about 9.5, alternatively about 8 to about 9, alternatively about 8.5. Carbon dioxide sensitive color changeable materials in these pKa ranges maintain most of the molecules of the color changeable pigment or dye in the first deprotonated or A⁻ state and first color in an environment with little or no carbon dioxide when the color changeable material composition is maintained at a mildly alkaline pH of about 9.0 to about 11.0, alternatively about 9.5 to about 10.5, alternatively about 10 respectively. Similarly, Applicants have determined that ammonia sensitive color changeable materials, e.g. pigments, dyes or particles, useful in the present technology typically have a pKa ranging from about 4.0 to about 6.5, alternatively about 4.5 to about 6.0, alternatively about 5. Ammonia sensitive color changeable materials in these pKa ranges maintain most of the molecules of the color changeable pigment or dye in the first protonated or HA state and first color in an environment with little or no ammonia when the color changeable material composition is maintained at a mildly acidic pH of about 2.5 to about 5.0, alternatively about 3.0 to about 4.5, alternatively about 3.5 respectively. The pKa values of specific color changeable materials useful in the present technology will be addressed further below.

Figure 3:
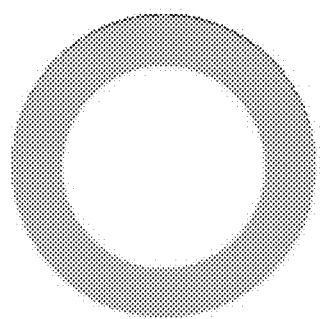
FIG. 3 shows a schematic illustration of a color changeable indicator particle according to an embodiment of the present invention with a color changeable indicator (2) disposed on a polymer core (1) before and after exposure to the relevant substance (A), e.g. $CO_2$.
Figure 3:
Figure 3:
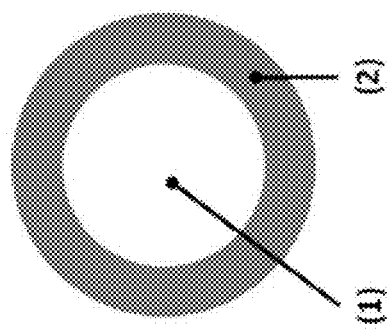

In one embodiment, the color changeable material is a color changeable particle that comprises a core and at least one color changeable pigment or dye coated on the core. For example, in one embodiment, the core can be an organic polymer particle (discussed herein, for example, as an organic core polymer or organic polymer core) having a melting point below about 200° C. In another embodiment, the core can be an inorganic core. In another embodiment, the color changeable material can have a mixture or organic and inorganic cores. A schematic illustration of a color changeable particle is shown in FIG. 3. The color changeable particle is made up of a core 1. The core is coated with at least one color changeable pigment or dye 2. Multiple color changeable particles of the present technology can be present in a mixture with each other and other components. A particle that may serve as the core is an organic polymer or inorganic substrate that is in the form of distinct or separate particles such that at least one color changeable pigment or dye 2 can be coated onto the particles 1 to form color changeable particles of the present technology as shown in FIG. 3.

The particulate organic core polymer can be, for example, low density polyethylene (LDPE), linear low density polyethylene (LLDPE), high density polyethylene (HDPE), isotactic polymethyl methacrylate (IPMMA), polymethyl methacrylate (PMMA), polystyrene (PS), polypropylene (PP), polyvinylidene fluoride (PVDF), polyoxymethylene (POMH), polybutene-1 (PB), nylon 11 (PA 11), nylon 12 (PA 12), ethylene-vinyl acetate (EVA), polycaprolactone (PCL), polyethylene oxide (PEOX), polypropylene oxide (PPDX) or mixtures thereof. Exemplary polymers and their melting points are listed in Table 1. As discussed further below, it is understood that the melting temperatures of a given organic polymer may vary depending on the composition of the specific polymer used or selected. For example, polyethylene may have a melting point in the range of about 105° C. to 180° C. with low density polyethylene in the range, for example, of about 105 to 120° C. and high density polyethylene, for example, in the range of about 120 to 180° C. Likewise, polypropylene may have a melting point, for example, in the range of about 160 to 170° C.

TABLE 1

Potential Particulate Organic Core Polymers and Bulk Polymers And Melting Temperatures

| Polymer | Abbreviation | Melting temp ° C. |
|---|---|---|
| Polystyrene | PS | 240 |
| Low density polyethylene | LDPE | 120 |
| Linear low density polyethylene | LLDPE | 127 |
| High density polyethylene | HDPE | 130 |
| Isotactic polymethyl methacrylate | IPMMA | 160 |
| Polymethyl methacrylate | PMMA | 160 |
| Polypropylene | PP | 165 |
| Polyvinylidene fluoride | PVDF | 177 |
| Polyoxymethylene | POMH | 175 |
| Polybutene-1 | PB | 126 |
| Nylon 11 | PA 11 | 185 |
| Nylon 12 | PA 12 | 175 |
| Ethylene-vinyl acetate | EVA | 72-98 |
| Polycaprolactone | PCL | 60 |
| Polyethylene oxide | PEOX | 66 |
| Polypropylene oxide | PPOX | 75 |

The particulate organic polymer used as the core polymer comprises a particle and may be available in the form of a powder comprised of particles. It is understood to a person of ordinary skill in the art that a particle has characteristics such as, for example, reduced size and typically spherical shape. The particle size of the organic core polymer particles of embodiments of the present invention can be relatively large, for example, having an average particle size of greater than about 1 micron, and preferably having an average particle size between about 10 and 1000 microns. It is known to a person of ordinary skill in the art how to prepare polymer powders with particles of appropriate size, for example, through known grinding or milling techniques. For example, the organic core polymer particles may generally have a particle size of greater than (>) about 10 microns in diameter, alternatively greater than (>) about 20 microns, alternatively greater than (>) about 50 microns, alternatively greater than (>) about 80 microns, alternatively greater than (>) about 110 microns, alternatively greater than (>) about 140 microns, alternatively greater than (>) about 170 microns, alternatively greater than (>) about 200 microns, alternatively greater than (>) about 230 microns, alternatively greater than (>) about 260 microns, alternatively greater than (>) about 290 microns, alternatively greater than (>) about 320 microns, alternatively greater than (>) about 350 microns, alternatively greater than (>) about 380 microns, alternatively greater than (>) about 410 microns, alternatively greater than (>) about 440 microns, alternatively greater than (>) about 470 microns and alternatively greater than (>) about 500 microns. In one preferred embodiment, the core polymer is LDPE with a particle size of about 250 microns. In such examples they are particulate, but not nanoparticulate and they do not need to be finely divided.

The particulate organic polymer used as the core polymer is meltable at generally low temperatures and has a melting point such that the core polymer is capable of being melted and/or extruded, for example, using known melting or extrusion techniques. The particulate organic polymer is preferably a solid at room temperature (approximately 20-22° C.) and, as discussed above, may take the form of a powder. In some embodiments, the particulate organic core polymer can have a melting point above room temperature and below about 200° C., alternatively above room temperature and below about 150° C., alternatively above room temperature and below about 100° C., alternatively above room temperature and below about 85° C. As discussed above, the melting temperatures of a given organic polymer used as the core polymer may vary depending on the composition of the specific polymer used or selected. For example, the core polymer may have a melting point in the range of about 105-180° C., about 105-120° C., about 120-180° C., or about 160-170° C. In certain embodiments, the melting point is between about 25° C. and about 200° C., alternatively about 60 to 120° C. or about 120 to 185° C., alternatively about 60-75° C.

The particulate inorganic substrate can be, for example, silicon dioxide, titanium dioxide, aluminum oxide, magnesium oxide or calcium oxide.

As discussed above, the particulate inorganic substrate used as the core comprises a particle and may be available in the form of a powder comprised of particles. It is understood to a person of ordinary skill in the art that a particle has characteristics such as, for example, reduced size and typically spherical shape. The particle size of the inorganic substrate particles of embodiments of the present invention can be 10 nm to 10 microns.

At least one color changeable indicator 2 is coated onto the particulate core 1 to form the color changeable particles of the present technology as shown in FIG. 3, which comprise an organic polymer core or inorganic substrate core. The at least one color changeable indicator detects the presence of a chemical substance shown as A in FIG. 3. As is shown in FIG. 3, the color changeable indicator 2 changes color when in the presence of the chemical substance A. Various pigments or dyes can be used as the present color changeable indicators in order to sense the different chemical substances. Such substances include, but are not limited to gases, such as carbon dioxide and ammonia. Detection may be performed using UV/Visible spectrophotometry, fluorimetry, or digital photography, coupled with color analysis.

Examples of carbon dioxide sensitive reactive dyes include, but are not limited to, m-Cresol Purple (MCP, Hydroxy triarylmethane), Thymolphthalein (3,3-bis(4-hydroxy-2-methyl-5-propan-2-ylphenyl)-2-benzofuran-1-one), o-Cresolphthalein, Acryloly florescein (AcFl), β-methyl umbelliferon (BMUB), Bromothymol blue (BTB, Hydroxy triarylmethane), 5' and 6'-Carboxyseminaphtholfluorescein (c-SNAFL), 5' and 6'-Carboxyseminaphtholrhodamine (c-SNARF), Cresol Red (CR, o-Cresolsulfonephthalein), Hexadecyl trimethyl ammonium cation ($CTA^+$), Hexadecyl trimethyl ammonium hydroxide (CTAH), Dual lumophore referencing (DLR), 2-(2,4-Dinitrophenylaxo)-1-naphthol-3,6disulphonic acid (DNPA), tris(thenoyltrifluoroacetonato) europium (III) ([$Eu(tta)_3$]), Fluorescein (Fl, resorcinolphthalein), 7-hydroxycoumarin-4-acetic acid (HCA), 1, Hydroxypyrene-3,6,8-trisulphonic acid (HPTS), Neutral red (NR, toluylene red), Phenol Red (PR, phenolsulfonphthalein), Rhodamine 6G (R6G), Sulforhodamine 101 (SRh), Thymol blue (TB, thymolsulphonephthalein), and/or Texas Red hydrazine (THR). The pKa values of some color changeable pigments or dyes are provided in Table 2.

TABLE 2

Examples of Carbon Dioxide Sensitive Pigments/Dyes and pKa

| Pigment/Dye | pKa |
| --- | --- |
| m-Cresol Purple (MCP, Hydroxy triarylmethane) | 8.3 |
| Thymolphthalein (3,3-bis(4-hydroxy-2-methyl-5-propan-2-ylphenyl)-2-benzofuran-1-one) | 9.7 |

TABLE 2-continued

Examples of Carbon Dioxide Sensitive Pigments/Dyes and pKa

| Pigment/Dye | pKa |
| --- | --- |
| o-Cresolphthalein, Acryloly florescein (AcFl) | 9.4 |
| β-methyl umbelliferone (BMUB) | 7.8 |
| Bromothymol blue (BTB, Hydroxy triarylmethane) | 7.1 |
| 5' and 6'-Carboxyseminaphtholfluorescein (c-SNAFL) | 7.4 |
| 5' and 6'-Carboxyseminaphtholrhodamine (c-SNARF) | 7.5 |
| Cresol Red (CR, o-Cresolsulfonephthalein) | 8.2 |
| Fluorescein (Fl, resorcinolphthalein) | 6.4 |
| 7-hydroxycoumarin-4-acetic acid (HCA) | 7.8 |
| 1, Hydroxypyrene-3,6,8-trisulphonic acid (HPTS) | 8.1 |
| Neutral red (NR, toluylene red) | 6.8 |
| Phenol Red (PR, phenolsulfonphthalein) | 7.6 |
| Thymol blue (TB, thymolsulphonephthalein) | 9.0 |

Examples of fluorimetric carbon dioxide sensitive dyes include but are not limited, to 1-hydroxypyrene-3,6,8-trisulphonate, 1,3-dihydroxypyrene-6,8-disulphonate, fluorescein, umbelliferone, 4-methylumbelliferone, 3-benzothiazoylbelliferone, 7-hydroxycoumarin-3-carboxylic acid, 1-naphthol-2-sulphonate, 1-naphthol-4-sulphonate, 2-naphthol-6-sulphonate, 7-hydroxyflavone, 7-hydroxyisoflavone, 3-hydroxyxanthone, 3,6-dihydroxyxanthone, 7-hydroxy-4-methylchromon, 7-hydroxylepidone, 3-hydroxyxacridone, harmol methoiodide, salicylaldehyde semicarbazone and 2-hydroxycinnamic acid. The pKa values of these color changeable pigments or dyes are provided in Table 3.

TABLE 3

Examples of Fluorimetric Pigments/Dyes and pKa

| Pigment/Dye | pKa |
| --- | --- |
| 1-hydroxypyrene-3,6,8-trisulphonate (HPTS) | 8.1 |
| 1,3-dihydroxypyrene-6,8-disulphonate | — |
| fluorescein | 6.4 |
| umbelliferone | 7.1 |
| 4-methylumbelliferone | 7.8 |
| salicylaldehyde semicarbazone | 7.8 |

Examples of dyes useful for making ammonia/amine optical sensors include, but are not limited to, Phloxine B, Methyl yellow, Bromophenol blue, Congo red, Methyl Orange, Bromochlorophenol blue, Ethyl orange, Fluorescein, Bromocresol green, Chrysoidin, Methyl red, Alizarin red, Cochineal, Chlorophenol red, Bromocresol purple, 4-Nitrophenol, Alizarin, Nitrazine yellow, Bromothymol blue, Brilliant yellow, Neutral red, Rosolic acid, Phenol red, m-Cresol purple, Thymol blue, Xylenol blue and Cresol red. The pKa values for these color changeable pigments or dyes are provided in Table 4.

TABLE 4

Examples of Ammonia Sensitive Pigments/Dyes and pKa

| Pigment/Dye | pKa |
| --- | --- |
| Phloxine B | 2.5 |
| Methyl yellow | 3.3 |
| Bromophenol blue | 3.9 |
| Congo red | 4.1 |
| Methyl Orange | 4.2 |

TABLE 4-continued

Examples of Ammonia Sensitive Pigments/Dyes and pKa

| Pigment/Dye | pKa |
|---|---|
| Bromochlorophenol blue | 6.0 |
| Ethyl orange | 4.3 |
| Fluorescein | 4.4 |
| Bromocresol green | 4.7 |
| Methyl red | 5.4 |
| Alizarin red S | 4.5 |
| Cochineal | 5.4 |
| Chlorophenol red | 6.3 |
| Bromocresol purple | 6.3 |
| 4-Nitrophenol | 7.1 |
| Alizarin | 6.8 |
| Nitrazine yellow | 6.4 |
| Bromothymol blue | 7.0 |
| Neutral red | 7.4 |
| Rosolic acid | 7.4 |
| Phenol red | 7.6 |
| m-Cresol purple | 1.5 |
| Thymol blue | 1.6 |
| Xylenol blue | 4.5 |
| Cresol red | 3.7 |

Various color change indicators have been described in applications and patents co-owned by applicant. These patents, applications and their related cases are incorporated herein by reference: U.S. Pat. Nos. 8,388,131, 8,663,998, 9,746,421 and U.S. patent application Ser. Nos. 14/292,246, 15/295,431, 15/832,379.

As discussed above, the color changeable material, e.g. pigment, dye and/or particle, may be present with other components to create a color changeable material composition. For example, acids or bases can be combined with the color changeable material to form a color changeable material composition. The acids or bases could be added in order to achieve the appropriate pH, as discussed above, to maintain most of the molecules of the color changeable pigment or dye in the desired first state, e.g. deprotonated for carbon dioxide indicators or protonated for ammonia indicators, and desired first color. For example, a base could be added to a carbon dioxide sensitive color changeable material having a pKa of 7.5 to obtain a pH of at least about 9, if needed. Similarly, acid could be added to an ammonia sensitive color changeable material having a pKa of 6.5 to obtain a pH of at least about 5, if needed. Examples of acids that can be added to the present color changeable material compositions include inorganic acids such as: hydrocholoric, nitric, sulfuric, perchloric, phosphoric acids and organic acids, such as: formic, acetic, tartaric, ascorbic, propanoic, butyric, valeric, oxalic, amlic, citric, benzoic, benzene sulfonic, succinic, uric, salicylic, toluene sulfonic and triflic acids. Examples of bases that can be added to the present color changeable material compositions include quaternary cations such as benzyltrimethyl ammonium, trioctylmethyl ammonium, tricaprylmethyl ammonium, tetraoctyl ammonium, tetrabutyl ammonium, cetyltrimethyl ammonium, tetrahexyl ammonium, tetraphenyl phosphonium, trioctyl phosphonium and hexadecyl tributyl phosphonium. In making the $CO_2$-sensing adhesive, the hydroxide salt of these cations are generally preferred, for example, tetraoctyl ammonium hydroxide, TOAOH, or tetra butyl ammonium hydroxide, TBAOH. Examples of bases and their abbreviations are shown in Table 2.

TABLE 2

Exemplary Bases

| Phase transfer agents | Abbreviation |
|---|---|
| Tetraoctyl ammonium | TOA |
| Tetrabutyl ammonium | TBA |
| Cetyltrimethyl ammonium | CTMA |
| Benzyltrimethyl ammonium | BTMA |
| Trioctylmethyl ammonium | TOMA |
| Tricaprylmethyl ammonium | TCMA |
| Tetrahexyl ammonium | THA |
| Tetraphenyl phosphonium | TPP |
| Trioctyl phosphonium | TOP |
| Hexadecyl tributyl phosphonium | HDTBP |

Other components could also be added to the color changeable material composition, e.g. solvents, polymers, etc.

Adhesives

Similar to that discussed above with regard to the color changeable material (or color changeable material composition), when making a color changeable adhesive, the adhesive (or adhesive composition, i.e. adhesive and any additional components, e.g. acid or base) should be selected to maintain most of the molecules of the color changeable material in a first state and first color in an environment containing little or none of the substance being detected until exposure to that substance, e.g. carbon dioxide or ammonia. An adhesive with an appropriate pH range and lack of reactive components is selected in order to achieve this goal. Adhesives with an inappropriate pH and/or presence of reactive components that will interfere with the chemistry of the color changeable material should be avoided. Generally, pressure sensitive adhesives are preferred as they tend to lack reactive components and do not include highly acidic or basic components that interfere with the chemistry of the color changeable material.

It is a goal of the present technology that the adhesive or adhesive composition has a pH level that allows most molecules of the color changeable material, e.g. pigment, dye and/or particles, to remain in the first state and first color in an environment containing little or none of the substance being detected until exposure to that substance, e.g. carbon dioxide or ammonia. This can be done, for example, by providing an adhesive or adhesive composition that has a pH that does not significantly alter the pH of the color changeable material composition when the two are combined. In one embodiment, an adhesive having an approximately neutral pH has been determined to be effective for maintaining the pH of the color changeable material composition when the two are combined. In another embodiment, an adhesive having a pH from about 5 to about 9 has been determined to be effective for maintaining the pH of the color changeable material composition when the two are combined, alternatively about 6 to about 8, alternatively about 7.

In a carbon dioxide sensing embodiment, an adhesive having a neutral pH or an alkaline pH up to the pH of the color changeable material composition (e.g. greater than or equal to about 1.5 above the pKa of the carbon dioxide sensitive color changeable material) has been determined to be effective for maintaining the pH of the color changeable material composition when the two are combined. In an ammonia sensing embodiment, an adhesive having a neutral pH or an acidic pH down to a pH of the color changeable material composition (e.g. less than or equal to about 1.5 below the pKa of the ammonia sensitive color changeable material) has been determined to be effective for maintaining the pH of the color changeable material composition when the two are combined.

In a preferred embodiment, the selected adhesive or adhesive composition does not contain or excludes or removes components that will interfere with the chemistry of the color changeable material. For example, many adhesives, particularly permanent adhesives, contain reactive additives that facilitate their role as strong adhesives; however these additives interfere with the color change reaction chemistry. Examples of reactive components that can interfere with the chemistry of color changeable materials discussed above include certain acid, bases, oxidants, reductants, catalysts, antimicrobials, buffers, etc. For example, the color change reactions for carbon dioxide and ammonia sensitive pigments or dyes involve acid/base and/or oxidation/reduction reactions. Thus, the inclusion of additional strong or extremely reactive acids, bases, oxidants or reductants (or large amounts of such components) can alter the color change chemistry of the carbon dioxide or ammonia sensitive pigments or dyes if an attempt is made to incorporate the pigment or dye into the adhesive. Similarly, buffers are intended to maintain pH at a desired level. If strong or extremely reactive buffers are present (or large amounts of a buffer), it can also affect the color change chemistry of the pigment or dye by maintaining an undesired pH level. As yet another example, catalysts are added to many adhesives to encourage or force reactions to occur. Again, this can alter the natural chemical reactions of the color changeable pigment or dye. In a preferred embodiment, the adhesive for use in embodiments of the present invention lacks a buffer, lacks a catalyst, lacks a strong acid, lacks a strong base, lacks oxidants, lacks reductants, and/or lacks antimicrobials.

Pressure sensitive adhesives are adhesives that form a bond when pressure is applied to attach the adhesive to the substrate to which it is being adhered. Solvents, water, or heat are not typically used to activate pressure sensitive adhesives. Pressure sensitive adhesives are typically peelable and are often used in pressure-sensitive tapes (e.g. cellophane tapes), labels, glue dots, note pads, automobile trim, and a wide variety of other products. Typically, pressure sensitive adhesives do not contain as many reactive components or additives as permanent adhesives. As such, pressure sensitive adhesives are particularly well suited to the present technology.

An elastomer typically functions as the primary base material in a pressure sensitive adhesive. Examples of elastomers include, but are not limited to, natural rubber, vinyl ethers, acrylics, butyl rubber, styrene block copolymers, silicones and nitriles. A tackifier can be added to the elastomer to increase adhesion. Examples of tackifiers include, but are not limited to, the following common resins: terpenes, aromatic resins, hydrogenated hydrocarbon resins and terpene-phenol resins. There are numerous types of pressure sensitive adhesives. They can be divided into categories according to the elastomer material, e.g. rubbers, acrylates and silicones.

Permanent adhesives, such as cyanoacrylate (super glue) and expoxy, are designed for long term adhesion and are not peelable. Permanent adhesives often include reactive components such as those discussed above, e.g. acids, bases, oxidants, reductants, catalysts, buffers, etc., in order to achieve a strong, permanent adhesion to a substrate, which interfere with the chemistry of the color changeable material. However, some permanent adhesives that lack certain additives are also suitable, e.g. silicone adhesive.

Examples of adhesives that can be used in embodiments of the present invention and their pH levels are provided in Table 6.

TABLE 6

| Examples of Adhesives and pH | |
|---|---|
| Adhesive | pH |
| Rubber/Water Based | |
| Tack White AT4M1(V1) | 8-10 |
| Tack White MT 30 P (V1) | 8-10 |
| Tack White SB 5 M1 (V1) | 7 |
| Tack White SB4 SL2 (V1) | 8-9 |
| Acrylic/Water Based | |
| Tack White A 11 DF | 3.5-4.5 |
| Tack White A 2P 60 (V2) | 6-8 |
| Tack White AP 26 | 5-6 |
| Tack White AK 11 | 6.7-7.5 |
| Tack White AR 35 | 7-9 |
| Acrylic/Solvent Based | |
| Solacril WS 40 | 2-5 |

Examples of additional adhesives that may be useful in embodiments of the present invention include other rubber/water based adhesives, other acrylic/water based adhesives, rubber/solvent based adhesives (e.g. Tacksol 10/83 B, Tacksol SM 3, Tacksol IS 56M2, Tacksol 10/89 HS), acrylic/solvent based adhesives (e.g. Solacril SPR 12 M3, Solacril 44) and hot melt adhesives (e.g. Tackmelt A43 A, Tackmelt A40, Tackmelt 53B).

As discussed above, the appropriate adhesive may also be present with other components to create an adhesive composition. For example, in some instances, an additional acid or base may be added to the appropriate adhesive to control its pH such that it will not alter the color change chemistry of the color changeable material composition when the adhesive composition and color changeable material composition are combined. For example, an acid or base may be added to the adhesive to achieve an adhesive composition having the pH levels discussed above. This adhesive composition can then be added to the color changeable material composition without affecting the color change chemistry. For example, in a carbon dioxide sensing embodiment, a base may be added to the adhesive to achieve an adhesive composition having a neutral pH or an alkaline pH up to the pH of the color changeable material composition (e.g. greater than or equal to about 1.5 above the pKa of the carbon dioxide sensitive color changeable material). Similarly, in an ammonia sensing embodiment, acid may be added to the adhesive to achieve an adhesive composition having a neutral pH or an acidic pH down to a pH of the color changeable material composition (e.g. less than or equal to about 1.5 below the pKa of the ammonia sensitive color changeable material). The adhesive composition can then be added to the color changeable material composition without affecting the color change chemistry.

Additional components can be added to the present color changeable adhesive that do not affect or interfere with the chemistry associated with the color changeable adhesive. Examples of such components include, but are not limited to, dyes or pigments which provide a background color, agents to facilitate mixing, etc.

The color changeable material (or color changeable material composition) and adhesive (or adhesive composition) can be mixed such that the color changeable material (or color changeable material composition) is substantially homogenously dispersed within the adhesive (or adhesive composition).

Applications Using the Color Changeable Adhesive

Color changeable adhesives of the present technology can be used to make color changeable indicators or sensors. The color changeable indicators or sensors can be attached to various items, e.g. food, pharmaceuticals, packaging, medical devices, etc., to provide a user with information regarding exposure.

Figure 2:
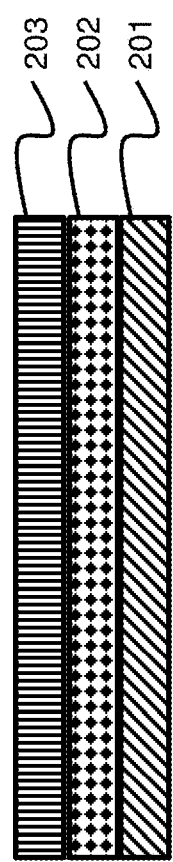
FIG. 2 shows an embodiment of a three-layer color changeable indicator.

In one embodiment, color changeable indicators or sensors made from the present color changeable adhesives can be used to attach a substrate directly to a diffusion layer to form a three-layer color change indicator as shown in FIG. 2. As is shown in FIG. 2 the color changeable adhesive 202 is coated directly onto the substrate 201. A diffusion layer or semi-permeable barrier layer 203 is then placed directly on top of the color changeable adhesive on the substrate. This is in contrast to the five-layer color changeable indicators that were previously known as shown in FIG. 1. The present three-layer color changeable indicators or sensors are preferred to the prior five-layer indicators or sensors because they greatly simplify the manufacturing process which offers significant cost savings.

In another embodiment, a pressure sensitive color changeable adhesive can be coated directly onto a substrate to form a color changeable tape or sticker. The color changeable tape or sticker has only two layers—the substrate and the pressure sensitive color changeable adhesive. A user can then adhere the color changeable tape or sticker to any desired surface to detect the presence of a substance. Such color changeable tapes or stickers could be provided in roll, on a sheet, etc.

Examples of possible substrates include, but are not limited to, low density polyethylene (LDPE), high-density polyethylene (HDPE), polypropylene (PP), polyvinyl chloride (PVC), polystyrene (PS), polyamide (nylon 6), polyester (PET), polyvinylidene chloride (PVDC). Examples of possible diffusion layers or semi-permeable barrier layers include, but are not limited to, low density polyethylene (LDPE), high-density polyethylene (HDPE), polypropylene (PP), polyvinyl chloride (PVC), polystyrene (PS), polyamide (nylon 6), polyester (PET), polyvinylidene chloride (PVDC), etc.

In some embodiments, particularly the color changeable tapes or stickers, a protective layer is disposed on the color changeable adhesive to improve longevity and prevent it from drying out. For example, a silicon release paper can be added to the top of the carbon dioxide sensitive color changeable adhesive. The silicon release paper protects the color changeable adhesive until the silicon release paper is peeled off.

Additional appropriate substrates and barriers and barrier layers are described in U.S. Pat. Nos. 8,388,131, 8,663,998, 9,746,421 and U.S. patent application Ser. Nos. 14/292,246, 15/295,431, 15/832,379 all of which are incorporated herein in their entirety.

In some embodiments, a self-contained gas layer, gas-containing substrate or gas generating layer (e.g. a carbon dioxide generating layer) is also included. Such gas layers, gas-containing substrates or gas generating layers are addressed in U.S. patent application Ser. No. 15/295,431 which is incorporated herein in its entirety.

The present color changeable adhesives or indicators can be used with disposable, limited, or restricted use products for indications about use. For example, the present color changeable adhesives can also be used with food and drug packaging for indications about freshness.

According to embodiments of the present application, a disposable, limited, or restricted use device could be a medical apparatus, such as a medical device, having a portion that comes in contact with, e.g., bodily fluids or tissue so as to be susceptible to the transmission of contaminates or disease to a patient and a color changeable adhesive disposed on or in the device is useful to indicate that the device should no longer be used due to contamination, expiration or some other manner of being compromised. The medical apparatus could be, e.g., a disposable catheter, a disposable scalpel, a disposable syringe and/or a disposable ophthalmic lens through which a clinician looks to view a patients' eye.

According to another embodiment of the present application, an apparatus with color changeable adhesive comprises a limited use apparatus that has a portion that comes in contact with bodily fluids or tissue and can potentially cause harm to a person if used beyond a limited time or reused and color changeable polymeric composites disposed on or in the apparatus can indicate to the user that the apparatus is no longer to be used. The apparatus could be a cosmetic applicator, an oral medication or food packaging having an expiration date after which those items should not be used.

In one embodiment, the three layer color changeable indicators or the color changeable stickers/tapes discussed above can be attached to the disposable, limited or restricted use product, e.g. the medical apparatus and/or its packaging. In another embodiment, the color changeable adhesive can be applied directly to the disposable, limited or restricted use product, e.g. the medical apparatus and/or its packaging.

In one example, the present carbon dioxide sensitive color changeable adhesive can be incorporated into the color changeable indicator or sensor. The color changeable indicator or sensor can be applied to a product that is flood packaged in a carbon dioxide rich environment. Based on the chemistry discussed above, most molecules of the carbon dioxide sensitive color changeable material in the carbon dioxide sensitive color changeable adhesive would be in the protonated or HA state in the carbon dioxide rich package. The internal atmosphere of the package can be pure carbon dioxide (approximately 100% carbon dioxide) or any other amount of carbon dioxide higher than the amount of carbon dioxide in the atmosphere, e.g. 10%, 20%, 30%, 40%, 50%, 60%, 70%, 80%, 90% carbon dioxide. When the package is subsequently opened and the color changeable indicator or sensor is exposed to atmospheric conditions with a lower carbon dioxide content (approximately 0.0397% carbon dioxide), the molecules of the color changeable material disposed on the product will change from their protonated or HA state which is a first color to their deprotonated or A⁻ state which is a second color. A similar process could be carried out with an ammonia sensor and ammonia flood packaging or other gases.

Example 1

$CO_2$ sensitive color changeable adhesives are made using color changeable particles comprising $CO_2$ sensitive dyes (phenol red, cresol red and rosalic acid) coated on inorganic SiO$_2$ cores with Tack White adhesive. Specifically, three different adhesives are made as follows. First, 0.1 g of color changeable particles (phenol red, cresol red and rosalic acid each coated on SiO$_2$ cores), 1 ml tetra butyl ammonium hydroxide as a base (40% in water), and 1 g of H$_2$O are combined to form a color changeable material composition. The components are mixed together by stirring. The color changeable material composition is then combined with 4 g of Tack White adhesive. These components are mixed together by stirring for at least 4 hours.

The resulting CO$_2$ sensitive color changeable adhesives are coated on clear polyethylene terephthalate film. The color change for each of the adhesives is shown in FIG. 4 which shows photographs of phenol red (left), cresol red (middle) and rosalic acid (right) based CO$_2$ sensitive adhesives with and without CO$_2$.

Figure 4:
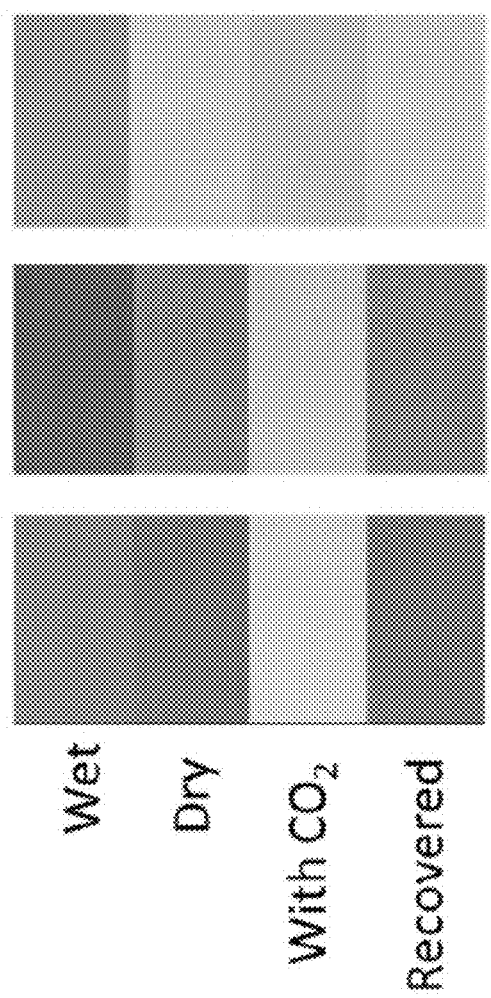
FIGS. 4 and 5 show photographs of $CO_2$ sensitive adhesives of an embodiment the present invention.

As can be seen from FIG. 4, the phenol red CO$_2$ sensitive adhesive forms a pink ink that dries to a purple color and changes to yellow when purged with CO$_2$, simulating packaging under CO$_2$. The adhesive returns to its original purple color within 1.5 min in air. The cresol red CO$_2$ sensitive adhesive forms a purple ink that dries to blue color, and changes to yellow in the presence of CO$_2$. The adhesive returns to blue within 2 min in air. The rosolic acid CO$_2$ sensitive adhesive forms a pink ink that dries to pale pink and changes to beige color with CO$_2$ present. It recovers to original color within 1 min in air.

The adhesives on clear polyethylene terephthalate film have a shelf life of longer than 2 weeks.

Example 2

Four formulas of color changeable adhesive are created as follows. First the Cresol Red, TBAOH and H$_2$O are combined and mixed by stirring to form a color changeable material composition. The color changeable material composition is then combined with Tack White and mixed by stirring. The formulas are outlined in Table 7 below.

TABLE 7

Color Changeable Adhesive Formulas - Varied Base and/or Phase Transfer Agent to Adhesive Ratios

| Formula | Cresol Red (g) | TBAOH (ml) | Tack white (g) | H$_2$O (g) |
|---|---|---|---|---|
| 1 | 0.02 | 1 | 2 | 1 |
| 2 | 0.02 | 0.5 | 2 | 1 |
| 3 | 0.02 | 0.5 | 3 | 1 |
| 4 | 0.02 | 0.5 | 4 | 1 |

The color changeable adhesives (Formulas 1-4) are then coated on clear polyethylene terephthalate film. Formulas 1-4 are tested for color change, tackiness and CO$_2$ sensitivity. The results are shown below in Table 8.

TABLE 8

Properties of Color Changeable Adhesives with Varied Color Changeable Materials

| Formula | Color change | Tackiness | CO$_2$ Sensitivity |
|---|---|---|---|
| 1 | Blue → yellow | Enough | Yes |
| 2 | Blue → yellow | Enough | Yes |
| 3 | Blue → yellow | Enough | Yes |
| 4 | Blue → yellow | Enough | Yes |

The "Color Change" results indicate that upon exposure to CO$_2$ the color changeable adhesive changes from the first color indicated above to the second color indicated above.

The "Tackiness" results herein indicate that the color changeable adhesive is tacky or sticky to physical touch and the color changeable adhesive will not rub off when physically touched. Tackiness can also be tested using tests known to persons of ordinary skill in the art such as a rolling ball test.

The "CO$_2$ Sensitivity" results indicate that the color changeable pigment or dye maintains its color change chemistry when used in a color changeable adhesive and the color changeable adhesive exhibits color change when exposed to CO$_2$, as is also shown by the "Color Change" results.

Formulas 1-4 all show appropriate color change and have adequate CO$_2$ sensitivity.

Formula 4 has the best consistency and tackiness.

Example 3

Three formulas of color changeable CO$_2$ sensitive color changeable adhesives are made with different color changeable materials using the amount of tetra butyl ammonium hydroxide, Tack White and water in Formula 4 from Example 2 above. They are created as follows. First the Dye (0.2 g of Cresol Red, Phenol Red or Rosalic Acid), 0.5 mL TBAOH and 1 g H$_2$O are combined and mixed by stirring to form a color changeable material composition. The color changeable material composition is then combined with 4 g Tack White and mixed by stirring.

The color changeable adhesives are then coated on clear polyethylene terephthalate film. The formulas are tested for color change, tackiness, CO$_2$ sensitivity, response time, recovery time and longevity. The results are shown below in Table 9.

TABLE 9

Properties of Color Changeable Adhesives with Varied Color Changeable Materials

| Dye | Color change | Tackiness | CO$_2$ Sensitivity | Response Time(sec) | Recovery Time (min) | Longevity (day) |
|---|---|---|---|---|---|---|
| Cresol red | Purple → yellow | Enough | Yes | 3 | 2 | 7 |
| Phenol red (sodium salt) | Purple → yellow | Enough | Yes | 3 | 1 | 7 |
| Rosolic acid | Pink → beige | Enough | Yes | 3 | 0.5 | 5 |

The Color Change, Tackiness and $CO_2$ Sensitivity are explained above in Example 2 and have the same meaning here.

The "Response Time" results show the amount of time before color change of a color changeable adhesive from an original color in atmospheric air to a new color upon exposure to 100% $CO_2$ gas.

The "Recovery Time" results show the amount of time before color change of an adhesive from the color upon exposure to 100% $CO_2$ gas back to the original color in atmospheric air upon removal of 100% $CO_2$ and exposure to atmospheric air.

The "Longevity" results indicate the amount of time that the color changeable adhesive maintains color upon exposure to atmospheric air.

All formulas show good color change, $CO_2$ sensitivity and tackiness. The color change is shown in FIG. 5 which shows photographs of phenol red (left), cresol red (middle) and rosolic acid based $CO_2$ sensitive adhesives with and without $CO_2$.

Figure 5:
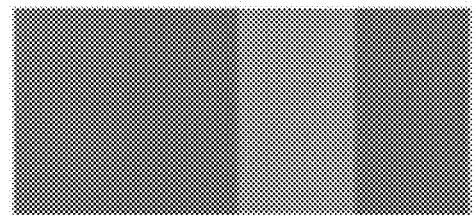
Figure 5:
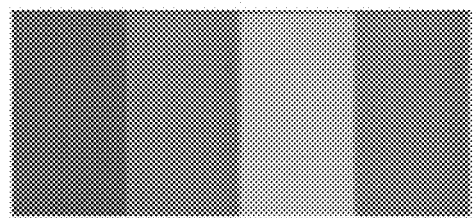
Figure 5:
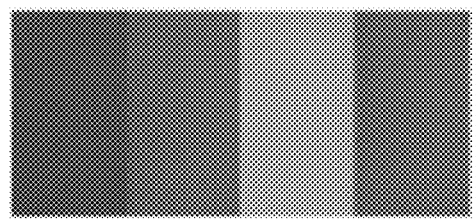

As can be seen from FIG. 5 the phenol red based $CO_2$ sensitive adhesive form a pink ink that dries to a purple color and changes to yellow when purged with $CO_2$, simulating packaging under $CO_2$. It recovers back to the original purple color in air. The cresol red based $CO_2$ sensitive adhesive forms a purple ink that dries to blue color, and changes to yellow with $CO_2$ present. It recovers back to blue in air. The rosolic acid based $CO_2$ sensitive adhesive forms a pink ink that dries to pale pink and changes to beige color with $CO_2$ present. It recovers to original color in air.

Example 4

Three formulas of color changeable $CO_2$ sensitive color changeable adhesives are made with different color changeable materials using the amount of tetra butyl ammonium hydroxide, Tack White and water in Formula 4 from Example 2 above. In addition, 2 mL of hydroxyethylcellulose (HEC) (5% in water) is added to each formula to generate a more stable $CO_2$ sensitive color changeable adhesive. They are created as follows. First the Dye (0.2 g of Cresol Red, Phenol Red or Rosalic Acid), 0.5 mL TBAOH, 2 mL of HEC and 1 g $H_2O$ are combined and mixed by stirring to form a color changeable material composition. The color changeable material composition is then combined with 4 g Tack White and mixed by stirring. The color changeable adhesives are then coated on clear polyethylene terephthalate film.

The formulas were tested for color change, tackiness, $CO_2$ sensitivity, response time and recovery time. These results have the same meanings discussed in Examples 2 and 3. The results are shown below in Table 10.

TABLE 10

Properties of Color Changeable Adhesives with Varied Color Changeable Materials and Added Polymer

| Dye | Color change | Tacky | $CO_2$ Sensitive | Response Time (sec) | Recovery Time (min) |
|---|---|---|---|---|---|
| Cresol red | Purple → yellow | Enough | Yes | 3 | 2 |
| Phenol red (sodium salt) | Purple → yellow | Enough | Yes | 3 | 1 |
| Rosolic acid | Pink → beige | Enough | Yes | 3 | 2 |

All formulas show good color change, $CO_2$ sensitivity and tackiness.

By adding a polymer, the shelf life of the $CO_2$ sensitive color changeable adhesive can be extended Example 5

Figure 6:
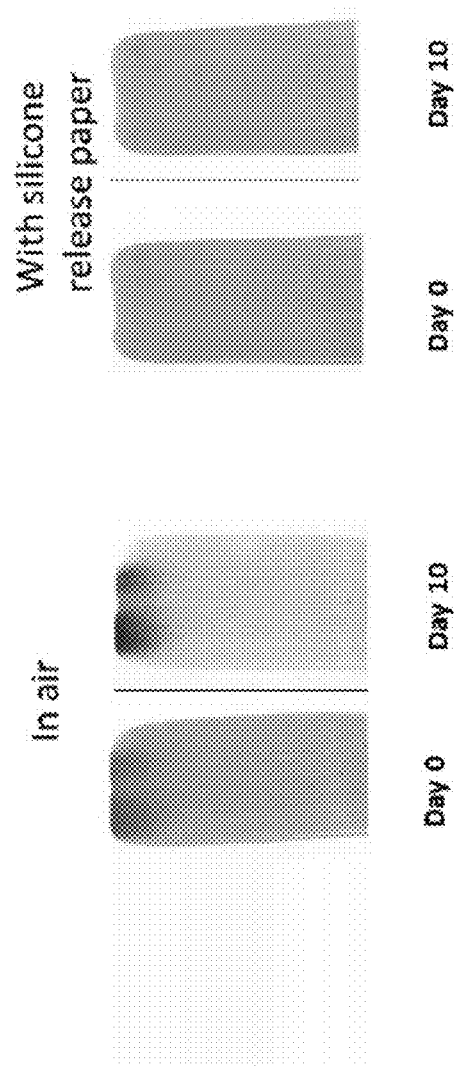
FIG. 6 shows photographs of $CO_2$ sensitive adhesives of an embodiment the present invention with and without a protective layer.

The color changeable adhesive of Formula 4 from Example 2 above is coated on clear polyethylene terephthalate film. A silicon release paper is added to the top of the $CO_2$ sensitive color changeable adhesive. FIG. 6 shows the results at Day 0 and Day 10 and shows that the longevity of a $CO_2$-sensitive color changeable adhesives can be improved using a silicone release layer.

While the application has been described with reference to certain embodiments, it will be understood by those skilled in the art that various changes may be made and equivalents may be substituted without departing from the scope of the application. In addition, many modifications may be made to adapt a particular situation or material to the teachings of the application without departing from its scope. Therefore, it is intended that the application not be limited to the particular embodiment disclosed, but that the application will include all embodiments falling within the scope of the appended claims.

The invention claimed is:

1. A color changeable adhesive comprising:
   a color changeable material selected from the group consisting of a color changeable pigment, dye, particle coated with a color changeable pigment or dye, or mixture thereof wherein the color changeable material has a pKa of 7.5 to 9.5; and
   a pressure sensitive adhesive having a pH that is neutral or alkaline up to a pH equal to or 1.5 greater than the pKa of the color changeable material;
   wherein the pigment, dye or particle is dispersed within the adhesive and wherein the pigment, dye or particle is a carbon dioxide indicator.

2. The color changeable adhesive of claim 1, wherein said color changeable adhesive further comprises a base.

3. The color changeable adhesive of claim 1 wherein the pigment, dye or particle is substantially homogenously dispersed within the adhesive.

4. The color changeable adhesive of claim 1 wherein the color changeable material is a dye selected from the group consisting of phenol red, cresol red and rosalic acid.

5. The color changeable adhesive of claim 1 wherein the pressure sensitive adhesive is tack white.

6. The color changeable adhesive of claim 2 wherein the base is tetra butyl ammonium hydroxide.

7. The color changeable adhesive of claim 1 wherein the color changeable material composition further comprises a polymer.

8. The color changeable adhesive of claim 7 wherein the polymer is hydroxyethylcellulose.

9. The color changeable adhesive of claim 1 wherein the color changeable material ranges from approximately 0.05 to approximately 20 weight percent of the color changeable adhesive.

10. The color changeable adhesive of claim 1 wherein the adhesive is selected from the group consisting of rubber/water based adhesives, acrylic/water based adhesives, rubber/solvent based adhesives, acrylic/solvent based adhesives and hot melt adhesives.

* * * * *